(12) United States Patent
Burmeister et al.

(10) Patent No.: US 10,393,489 B1
(45) Date of Patent: Aug. 27, 2019

(54) EXPLOSIVE INITIATION SAFETY AND HANDLING METHOD FOR EXPLOSIVE ORDNANCE DISPOSAL ROBOTS

(71) Applicant: The United States of America as represented by the Secretary of the Navy, San Diego, CA (US)

(72) Inventors: Aaron Bruce Burmeister, San Diego, CA (US); Kurt Arthur Talke, San Diego, CA (US); Daniel Tai Yung Leung, San Diego, CA (US); Mendel Lewis Baker, Jr., San Diego, CA (US); Matthew E Jones, San Diego, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 0 days.

(21) Appl. No.: 16/143,695

(22) Filed: Sep. 27, 2018

(51) Int. Cl.
| | |
|---|---|
| *F41H 11/14* | (2006.01) |
| *F42D 5/04* | (2006.01) |
| *B25J 11/00* | (2006.01) |
| *C06C 5/04* | (2006.01) |

(52) U.S. Cl.
CPC .............. *F42D 5/04* (2013.01); *B25J 11/0025* (2013.01); *C06C 5/04* (2013.01)

(58) Field of Classification Search
CPC .......... F41H 11/16; F41H 11/14; F41H 7/005; F42B 33/06; F42B 39/00; F42B 39/30
USPC ............................................... 86/50; 89/1.13
See application file for complete search history.

(56) References Cited

U.S. PATENT DOCUMENTS

| | | | | |
|---|---|---|---|---|
| 5,413,046 A | * | 5/1995 | Sobczak | C06C 5/04 102/275.7 |
| 6,113,343 A | * | 9/2000 | Goldenberg | B25J 5/005 239/587.2 |
| 6,253,450 B1 | * | 7/2001 | Woodall | B63G 7/02 29/281.5 |
| 7,331,436 B1 | * | 2/2008 | Pack | B65H 75/425 191/12.2 A |
| 8,037,797 B1 | * | 10/2011 | Frank | F41H 11/14 89/1.13 |

(Continued)

*Primary Examiner* — Michael D David
(74) *Attorney, Agent, or Firm* — Naval Information Warfare Center Pacific; Kyle Eppele; Susanna J. Torke

(57) ABSTRACT

A method comprising the steps of providing an Explosive Initiation Safety and Handling System (EISS) coupled to a robot, operatively coupling a charge carrier table and a manipulator to the robot; securing a charge to the charge carrier table; installing a shock tube spool on the shock tube spooling mechanism and locking with an indexing nut; inserting the shock tube that has been uncoiled from the spooling mechanism into the interrupter and replacing the cap; attaching the shock tube to the charge; making an initiator-to-interrupter connection with the shock tube; retracting the manipulator on the robot to a fully stowed position and rotating the charge carrier in front of the robot; picking up the charge with the manipulator, extending the manipulator forward and placing the charge at a threat; stowing the charge carrier; positioning the robot at a distance from the threat, allowing the shock tube to spool out; remotely activating a first firing circuit on the robot to arm the system; cutting the shock tube inside the interrupter and aligning the shock tube with the initiator; and firing a second circuit to initiate the shock tube.

5 Claims, 6 Drawing Sheets

(56) References Cited

U.S. PATENT DOCUMENTS

| | | | | |
|---|---|---|---|---|
| 8,714,069 | B1* | 5/2014 | Woodall | F41H 11/14 |
| | | | | 102/402 |
| 9,027,455 | B1* | 5/2015 | Woodall | F41H 11/14 |
| | | | | 89/1.13 |
| 10,001,348 | B2* | 6/2018 | Zickel | B25J 11/0025 |
| 2005/0066799 | A1* | 3/2005 | Fish, Jr. | F42B 33/06 |
| | | | | 86/50 |
| 2006/0144279 | A1* | 7/2006 | Bawabe | C06C 5/04 |
| | | | | 102/275.12 |
| 2011/0000363 | A1* | 1/2011 | More | F41A 25/04 |
| | | | | 89/43.01 |
| 2014/0238222 | A1* | 8/2014 | McKay | F41H 11/12 |
| | | | | 89/1.13 |
| 2016/0200408 | A1* | 7/2016 | Robertson | F41H 11/16 |
| | | | | 89/1.13 |
| 2017/0343323 | A1* | 11/2017 | Burmeister | F41H 7/005 |
| 2018/0054955 | A1* | 3/2018 | Oliver | A01B 79/02 |

* cited by examiner

EXPLOSIVE INITIATION SAFETY AND HANDLING METHOD FOR EXPLOSIVE ORDNANCE DISPOSAL ROBOTS

FEDERALLY-SPONSORED RESEARCH AND DEVELOPMENT

The Explosive Initiation Safety and Handling Method for Explosive Ordnance Disposal Robots is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil. Reference Navy Case Number 109439.

BACKGROUND

Most currently fielded Explosive Ordnance Disposal (EOD) robots are equipped with radio-controlled firing circuits, these are only considered safe for a small subset of operations due to the risk of accidental ignition. Instead, most EOD teams normally use non-electric ignition of countercharges to dispose of hostile Improvised Explosive Devices (IED) Non-electric ignition requires a robot to drag a small plastic shock-tube hundreds of feet from the control unit to the IED The shock tube can be damaged by obstacles or other causes, greatly reducing reliability of the charge, and often becomes wound in the robot's tracks, crippling the robot and exposing the EOD technicians to danger in order to complete the mission and recover the robot under extremely hazardous conditions, risking mission failure, and potentially injury and fatalities to the Warfighter and/or robot.

Additionally, placing the countercharge in a manipulator limits the robot's maneuverability and flexibility, as the manipulator cannot be used for its normally intended functions. A few other systems have been developed which allow for the spool to be carried by the robot, but none of them allow for remote detonation from the robot. The system disclosed herein allows for such remote detonation.

DETAILED DESCRIPTION OF SOME EMBODIMENTS

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

The Explosive Initiation Safety and Handling System (EISS) for Explosive Ordnance Disposal (EOD) robots provides an effective and reliable remotely operated mechanical interrupter in the non-electric firing circuit which permits EOD technicians to safely use the built-in electric firing circuits on EOD robots with all types of countercharges. This system eliminates problems with damaged shock tubes, provides a mechanical safety interlock that can be visually verified, enables the use of the manipulator while carrying a countercharge, and significantly reduces instances of crippled robots, thus increasing the robot flexibility, reliability, and safety for the Warfighter and robot.

The EISS described herein has various embodiments that can be designed and configured to work with other shock tube initiators as well as other unmanned ground vehicles (UGVs), based on the size of the shock-tube, the location and particular terrain, or any other variable.

Figure 1:
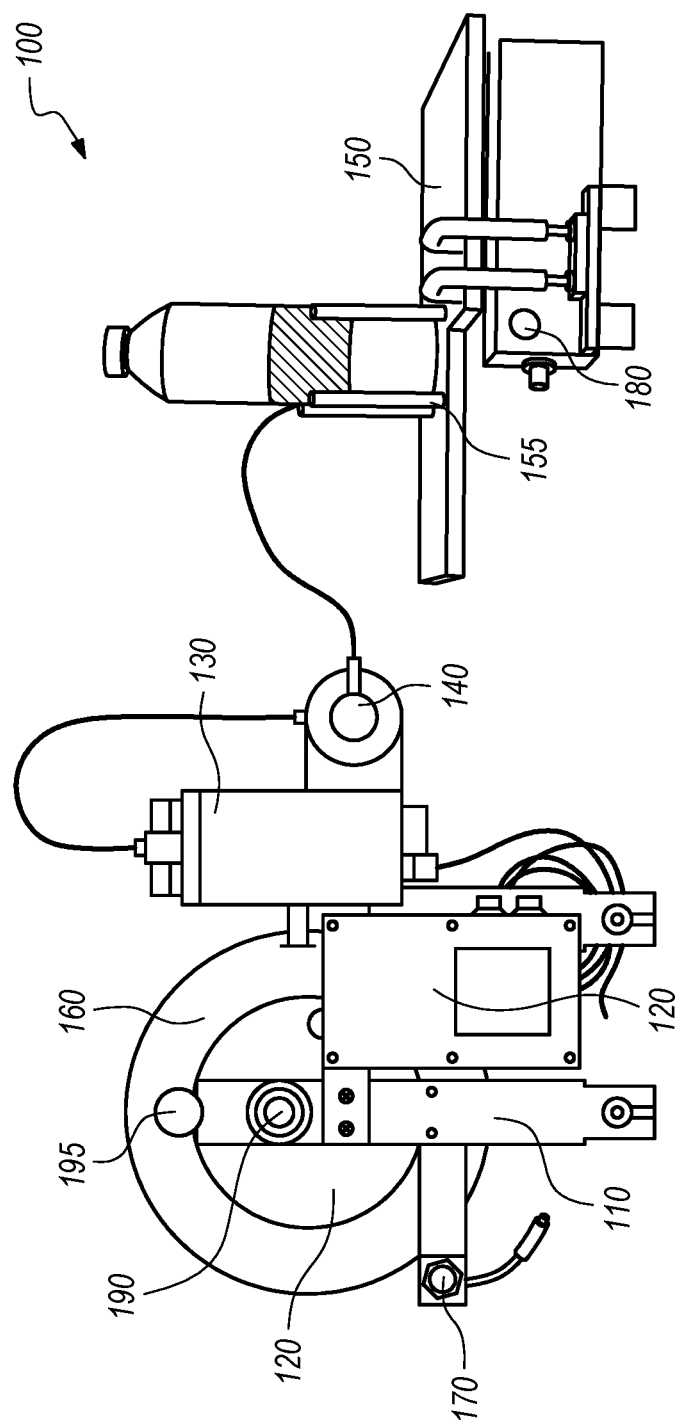
FIG. 1 shows an embodiment of an Explosive Initiation Safety and Handling System (EISS).

FIG. 1 shows an embodiment of an EISS 100 separated into five subsystems: spool base 110, control electronics 120, initiator 130, interrupter 140, and charge carrier 150. Charge carrier 150 allows for pins 155 to secure charges of varying sizes. Spool base 110 is the structural base for half of EISS 100, and physically supports shock-tube spooling mechanism 160, control electronics 120, initiator 130, interrupter 140, and proximity sensor 170. Proximity sensor 170 senses when a manipulator, not visible in this figure, is in a stowed position. Control electronics 120 are rigidly mounted to spool base frame 110, and are electrically connected to initiator 130, interrupter 140, charge carrier 150, proximity sensor 170, and a firing circuit that is not visible in this figure. Control electronics 120 receive a signal from rear, fully stowed proximity sensor 170, and instruct charge carrier 150 to rotate in front of a robot not visible in this figure. A proximity sensor 180 senses when a manipulator, not visible in this figure, extends forward to place a charge. Control electronics 120 takes the input from the first firing circuit not visible here to arm interrupter 140, and the input from a second firing circuit also not visible here to activate initiator 130.

Initiator 130 is rigidly mounted to spool base 110. One example of an initiator 130 that may be used with system 100 is a Duke Pro initiator manufactured by Duke Pro, Inc. Various mounting brackets can be designed to accommodate different embodiments of initiators. Interrupter 140 is rigidly mounted to spool base frame 110, and acts as an automatic shock tube splicing mechanism, further detailed in FIG. 5. An alternate initiator can be configured to work with EISS 100. An adjustable braking mechanism 190 allows for a user to optimize the spooling tension to avoid over-spooling and backlash. Adjustable indexing nut 195 sits above adjustable braking mechanism 190.

Figure 2:
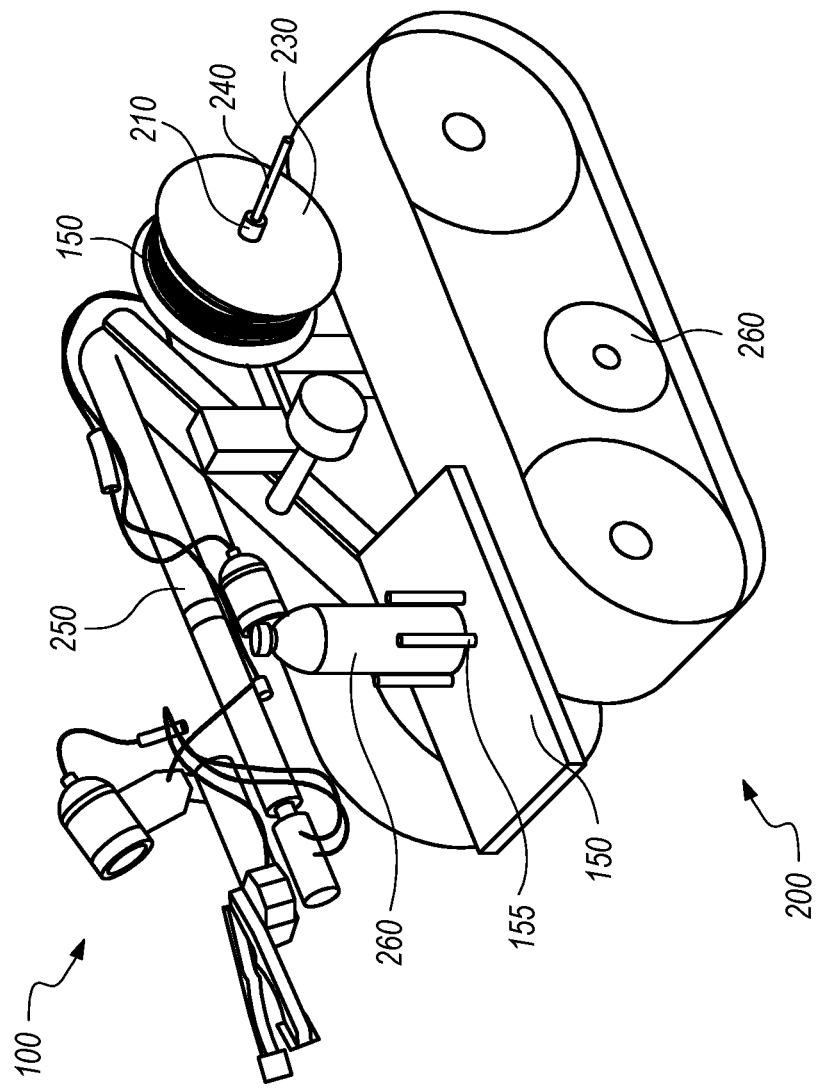
FIG. 2 shows an embodiment of an Explosive Initiation Safety and Handling System mounted on a robot.

FIG. 2 shows an embodiment of robot 200 having an EISS 100 described in FIG. 1 mounted on top. As shown, robot 200 is a Talon robot manufactured by QinetiQ. However, other robotic platforms may be used with EISS 100 without departing from the scope of the system disclosed herein. Two push connect pins not visible here can attach EISS 100 to robot 200 for easy removal and installation. A manually removable collet 210 allows EISS 100 to accommodate varying shock-tube diameters and thicknesses. An adjustable indexing nut 195 visible in FIG. 1 connects spool 230 rigidly to rotating shaft 240, and adjustable braking mechanism 190 visible in FIG. 1 allows for the user to optimize the spooling tension to avoid over-spooling and backlash. Manipulator 250 picks up countercharge 260, and manipulator 250 extends forward and sets down charge 260 in front of robot 200, then moves back into a stowed position. Adjustable proximity sensor 170 (visible Fib. 1) senses when manipulator 250 is back in the stowed position.

Charge carrier 150 attaches to robot 200 with a removable pin not visible here, and allows for the storing of countercharge 260 to the side of robot 200 enabling the use of manipulator 250 during IED approach and interrogation. An adjustable pin pattern on top of charge carrier 150 allows for convenient placement of countercharge 260 with easily removable pins 155. Once the operator (a command from a person driving robot 200 remotely) retracts manipulator 250 to the fully stowed position, interrupter 140 rotates charge carrier 150 out in front of robot 200, so that manipulator 250 can pick up countercharge 260.

Figure 3A:
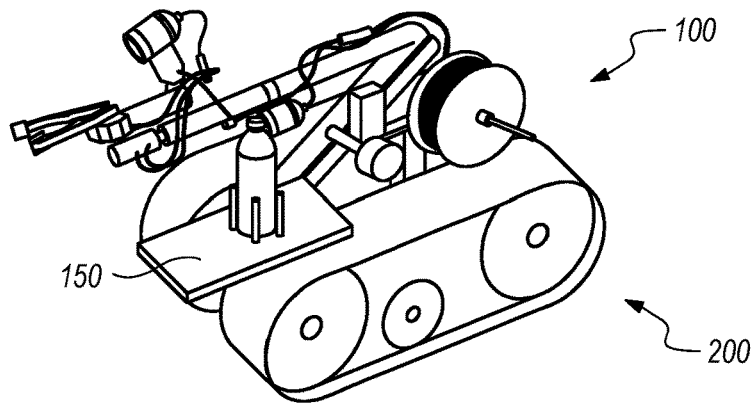
FIGS. 3A-3C show an embodiment of an Explosive Initiation Safety and Handling System mounted on a robot, where 3A shows the charge carrier in the stowed position, 3B shows the charge carrier in the deployed position, and 3C shows a close-up view of the charge carrier having multiple pins for different sized charges.
Figure 3B:
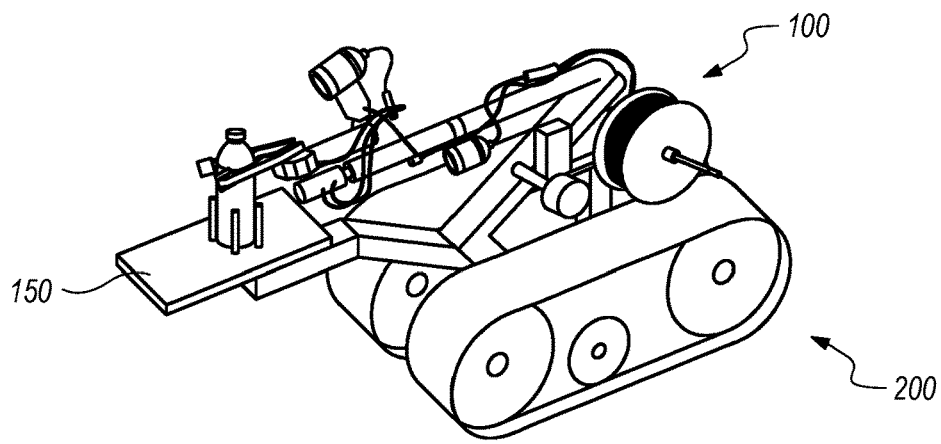
Figure 3C:
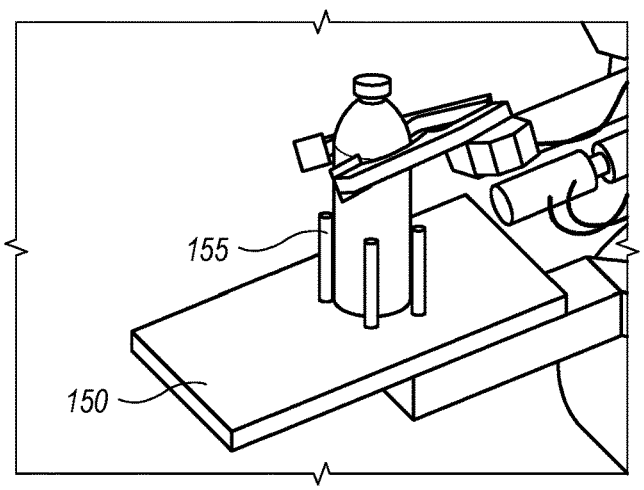

FIGS. 3A-3C show an embodiment of an EISS 100 mounted on a robot 200, where 3A shows charge carrier 150 in the stowed position, 3B shows charge carrier 150 in the deployed position, and 3C shows a close-up view of charge carrier 150 having multiple pins 155 for different sized charges.

Figure 4:
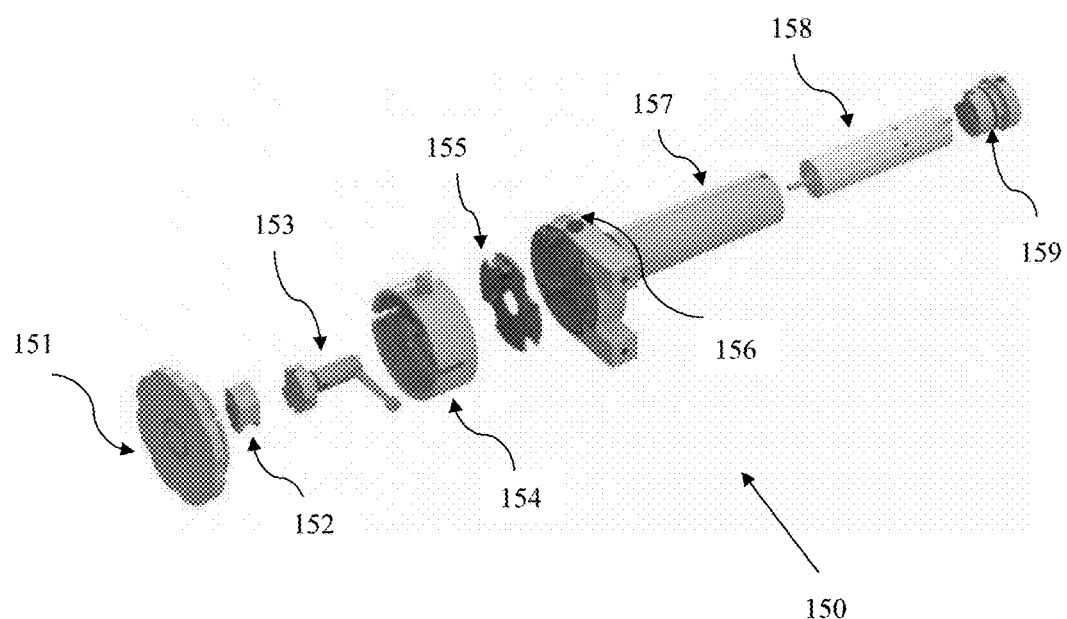
FIG. 4 shows a three-dimensional, exploded view of an Interrupter.

FIG. 4 shows an exploded view of Interrupter 150. Interrupter 150 has a removable lid 151, which allows for easy installation of a shock tube. It allows for a shock tube to spool through while robot 200 backs away after countercharge 260 has been placed by manipulator 250, visible in FIG. 2. Interrupter 150 also has a cutter 152, a rotor 153, a rotor housing 154, a circuit board 155, arm/safe indicators 156, motor housing 157, a motor 158, and a motor cap 159. When an arm signal is received from the control electronics 130 (visible in FIG. 1), interrupter 150 cuts the spooled shock tube from the spool mechanism 120 (visible in FIG. 1), and physically redirects and splices the cut shock tube to the shock tube connected to initiator 140 (FIG. 1). Additionally, interrupter 150 visually displays status via red or green LED 156. After a shock tube is fired and spent, interrupter 150 automatically discharges the spent shock tube to prevent fouling upon retrieval of a robot.

Figure 5A:
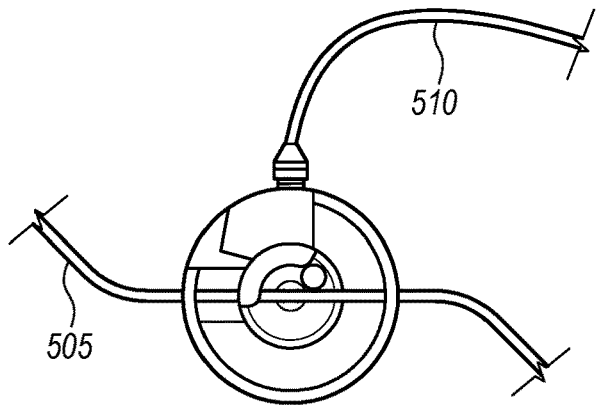
FIGS. 5A-5C show the various interrupter functions.
Figure 5B:
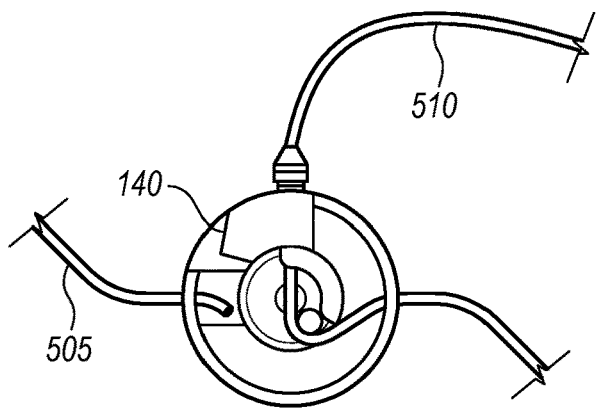
Figure 5C:
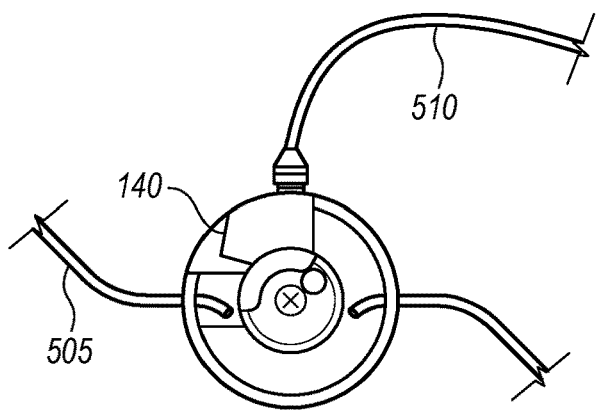

FIGS. 5A-5C show the various different interrupter 140 functions. In FIG. 5A, shock tube 505 is passed through interrupter 140, whereas shock tube 510 attaches from initiator 130 (FIG. 1) to interrupter 140 (FIG. 1). In FIG. 5B, a motor 515 rotates, cutting shock tube 505 and aligning and attaching it to shock tube 510 connected to initiator 130 (FIG. 1). The initiator fires, igniting the shock tube and the charge. After firing of shock tube 505, motor 515 rotates back to the original position and shock tube 505 is free to fall out of interruptor 140, as seen in FIG. 5C.

Figure 6:
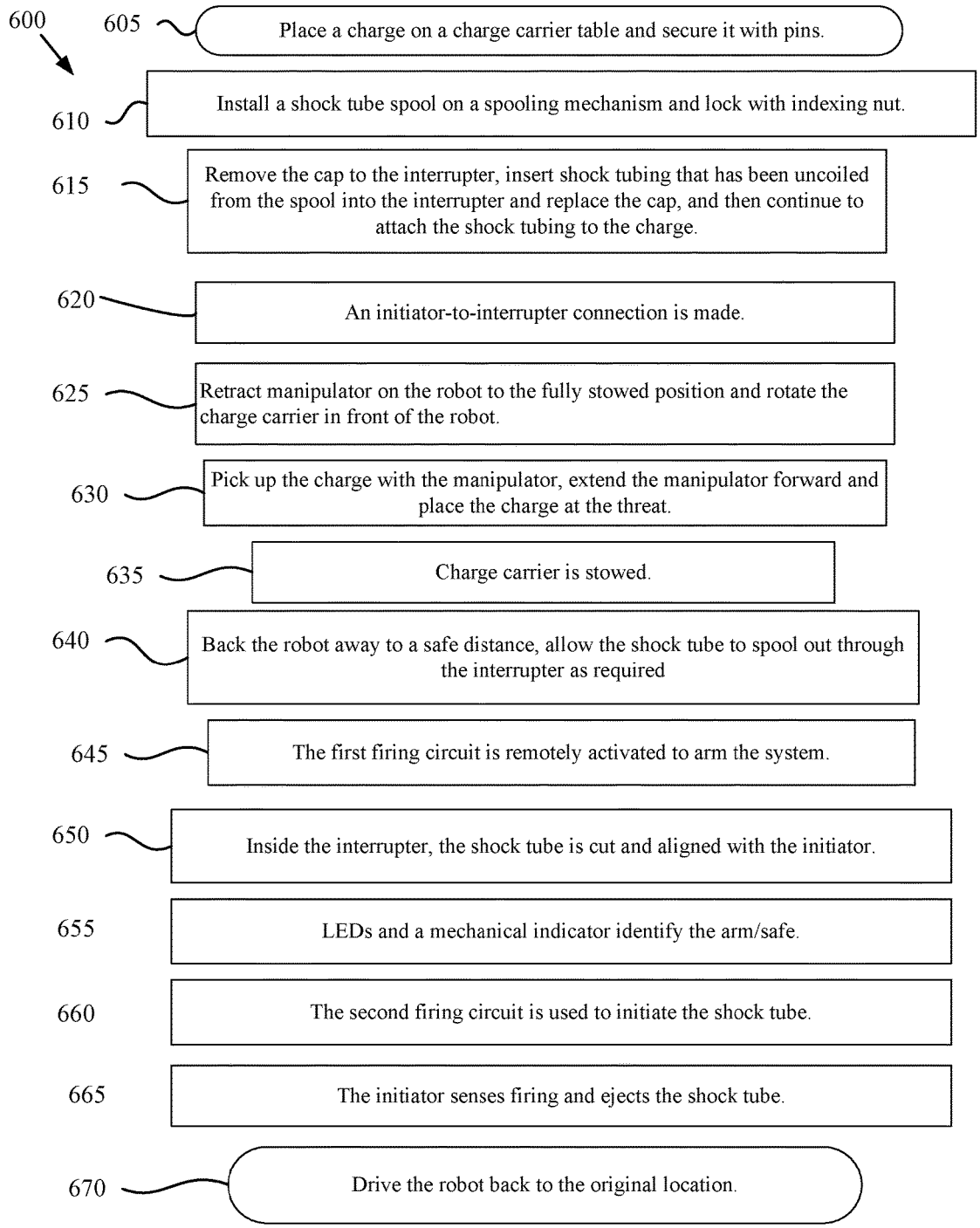
FIG. 6 shows a flow chart of a method for using the EISS.

FIG. 6 is a flow chart depicting the steps for using an EISS.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method comprising the steps of:
providing an Explosive Initiation Safety and Handling System (EISS) operatively coupled to a robot wherein the EISS comprises a spool base frame coupled to a shock tube spooling mechanism, wherein the shock tube spooling mechanism has a shock tube spool disposed thereon, an initiator, an interrupter, control electronics, and proximity sensors;
operatively coupling a charge carrier table and a manipulator to the robot;
securing a charge to the charge carrier table;
installing the shock tube spool on the shock tube spooling mechanism and locking with an indexing nut;
inserting the shock tube that has been uncoiled from the spooling mechanism into the interrupter and replacing a cap;
attaching the shock tube to the charge;
making an initiator-to-interrupter connection with the shock tube;
retracting the manipulator on the robot to a fully stowed position and rotating the charge carrier in front of the robot;
picking up the charge with the manipulator, extending the manipulator forward and placing the charge at a threat;
stowing the charge carrier table;
positioning the robot at a distance from the threat, allowing the shock tube to spool out;
remotely activating a first firing circuit on the robot to arm the EISS;
cutting the shock tube inside the interrupter and aligning the shock tube with the initiator;
and firing a second circuit to initiate the shock tube.

2. The method of claim 1 wherein the manipulator retracts to a fully stowed position, causing the charge carrier table to be rotated in front of the robot allowing for access to a countercharge.

3. The method of claim 2 wherein the interrupter cuts the spooled shock tube from the spool and physically redirects and splices the cut shock tube connected to the initiator upon receiving an arm signal from the control electronics.

4. The method of claim 3 wherein, upon shock tube firing, the interrupter automatically discharges the spent shock tube, preventing fouling upon retrieval of the robot.

5. The method of claim 3 wherein the EISS uses LED lights and a mechanical indicator identifying the arm/safe.

\* \* \* \* \*